United States Patent
Pruitt et al.

(10) Patent No.: US 8,656,694 B2
(45) Date of Patent: Feb. 25, 2014

(54) AUXILIARY DRIVE MOTOR FOR HAY CONDITIONER ON A WINDROWER HEADER

(75) Inventors: Martin E. Pruitt, Hesston, KS (US); Brendon C. Nafziger, Canton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/348,735

(22) Filed: Jan. 12, 2012

(65) Prior Publication Data

US 2012/0174550 A1 Jul. 12, 2012

Related U.S. Application Data

(60) Provisional application No. 61/431,983, filed on Jan. 12, 2011.

(51) Int. Cl.
*A01D 34/00* (2006.01)

(52) U.S. Cl.
USPC .......................... 56/10.6; 56/16.4 R

(58) Field of Classification Search
USPC ....... 56/10.6, 16.4 R, 16.4 B, 16.4 C; 60/248, 60/421, 486, 468, 422
See application file for complete search history.

(56) References Cited

U.S. PATENT DOCUMENTS

| | | | | |
|---|---|---|---|---|
| 3,165,875 | A * | 1/1965 | Mitchell | 56/13.9 |
| 4,663,919 | A * | 5/1987 | Stroh et al. | 56/11.2 |
| 4,890,801 | A * | 1/1990 | Brouwer et al. | 83/861 |
| 4,896,483 | A * | 1/1990 | O'Halloran et al. | 56/1 |
| 5,022,219 | A * | 6/1991 | Knurr et al. | 56/16.4 R |
| 5,430,997 | A * | 7/1995 | O'Halloran et al. | 56/6 |
| 5,463,852 | A * | 11/1995 | O'Halloran et al. | 56/6 |
| 6,029,432 | A * | 2/2000 | Kraus et al. | 56/16.4 B |
| 6,062,010 | A * | 5/2000 | Kraus et al. | 56/16.4 R |
| 6,158,201 | A * | 12/2000 | Pruitt et al. | 56/6 |
| 6,425,232 | B1 | 7/2002 | Desnijder et al. | |
| 6,718,744 | B2 * | 4/2004 | Rosenbalm et al. | 56/6 |
| 6,990,807 | B2 * | 1/2006 | Bird et al. | 60/468 |
| 7,647,757 | B2 * | 1/2010 | Rinholm et al. | 56/249 |
| 7,730,701 | B1 | 6/2010 | Ehrhart et al. | |
| 7,958,708 | B2 * | 6/2011 | Nickel et al. | 56/16.4 C |
| 8,006,470 | B2 * | 8/2011 | Pruitt et al. | 56/16.4 C |
| 8,161,719 | B2 * | 4/2012 | Barnett et al. | 56/157 |
| 8,166,736 | B2 * | 5/2012 | Nickel et al. | 56/16.4 C |
| 8,220,234 | B2 * | 7/2012 | Pruitt et al. | 56/16.4 C |
| 8,240,114 | B2 * | 8/2012 | Barnett | 56/6 |
| 8,286,411 | B2 * | 10/2012 | Barnett et al. | 56/157 |
| 8,291,685 | B2 * | 10/2012 | Pruit et al. | 56/157 |
| 8,297,033 | B2 * | 10/2012 | Pruit et al. | 56/157 |
| 2002/0040702 | A1 * | 4/2002 | Tarasinski | 123/350 |
| 2004/0060271 | A1 | 4/2004 | Ameye | |

OTHER PUBLICATIONS

International Search Report for International Application No. PCT/US2012/021013 Dated Apr. 17, 2012.

* cited by examiner

*Primary Examiner* — Árpád Fábián-Kovács

(57) ABSTRACT

Disclosed is a crop harvesting header configured for attachment to a mobile frame of a harvesting machine. The header has a cutter mechanism to cut crop material and a pair of laterally extending crop conditioner rolls to condition crop material cut by the cutter mechanism. The header includes a header power system having first and second main hydraulic motors and a belt and sheave drive configured to transmit power from the main hydraulic motors to the pair of conditioner rolls. The header also includes an auxiliary drive motor directly connected one of the conditioner rolls of the pair of conditioner rolls.

5 Claims, 5 Drawing Sheets

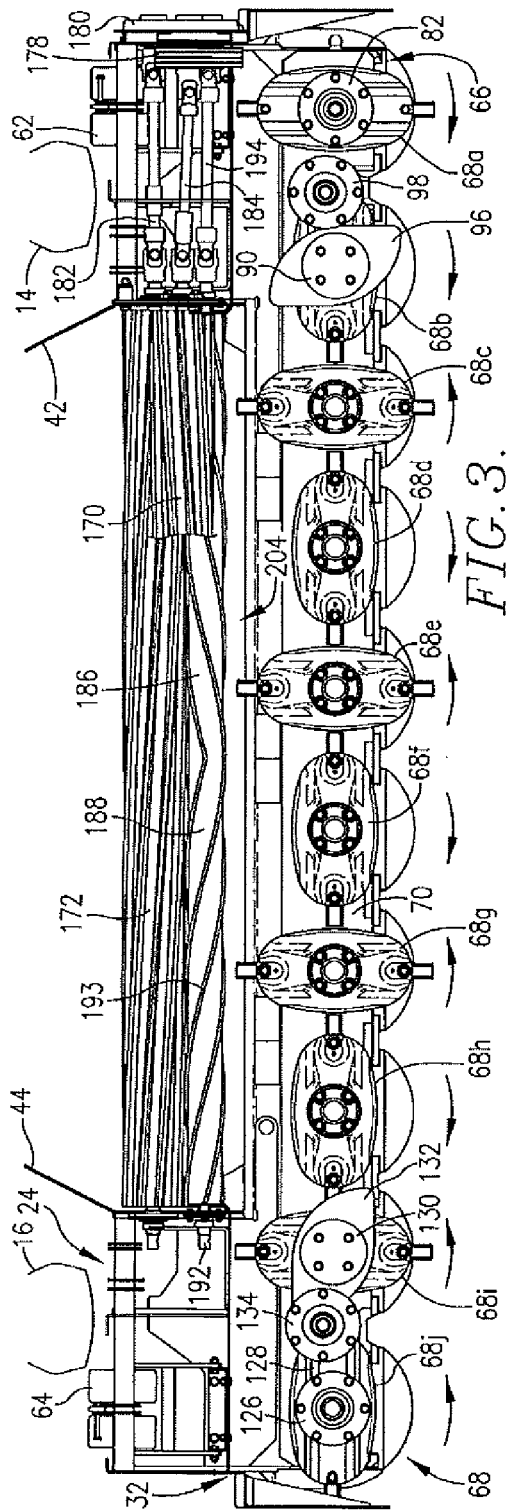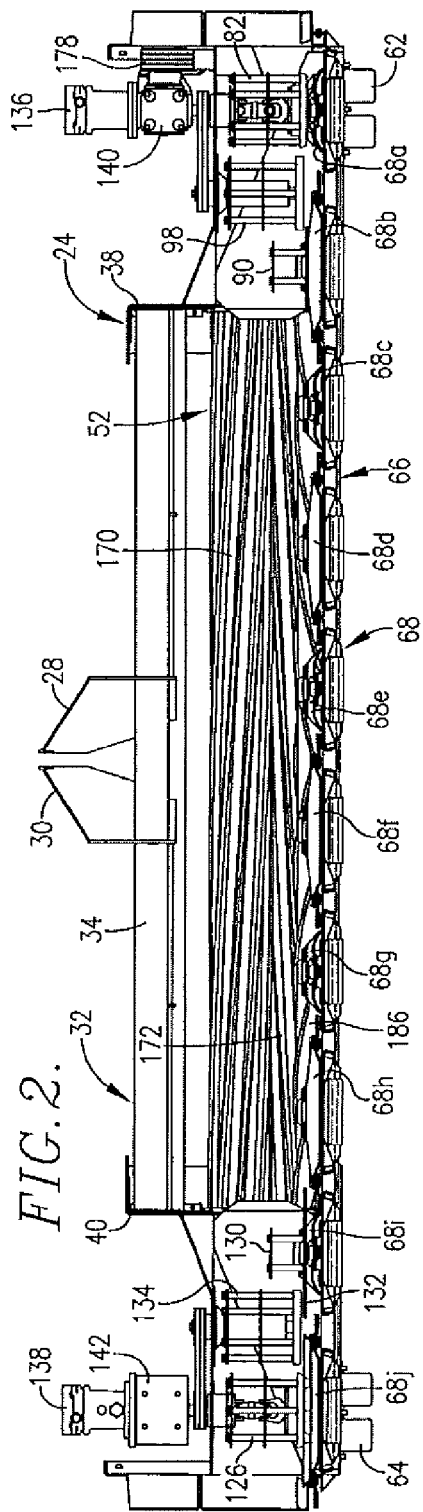

AUXILIARY DRIVE MOTOR FOR HAY CONDITIONER ON A WINDROWER HEADER

CROSS REFERENCE TO RELATED APPLICATIONS

This application claims priority to U.S. Provisional Application No. 61/431,983 filed Jan. 12, 2011, entitled "AUXILIARY DRIVE MOTOR FOR HAY CONDITIONER ON A WINDROWER HEADER".

BACKGROUND OF THE INVENTION

1. Field of Invention

This invention relates to crop harvesting machines of the type that use rotary cutters to sever standing crops from the field and then condition the cut crop between one or more sets of conditioner rolls before depositing the crop back onto the ground in the form of a windrow or swath, and more particularly to conditioner rolls powered with an auxiliary power drive.

2. Description of Related Art

Wide cut rotary harvesters present inherent challenges in getting outboard severed crop materials to flow smoothly and without hesitation in a lateral direction toward the center of the machine before then turning rearwardly and moving through a central discharge opening into the conditioner rolls. Hesitation on the part of the crop materials as they "turn the corner"' and move rearwardly into the conditioner rolls can cause problems, both in the quality of the finished windrows and the quality of cutoff being achieved by the rotary cutters. Due to the increased speeds at which rotary harvesters can travel compared to that of sickle-type machines, cutoff, feeding and control problems are exacerbated in rotary machines due to the dramatically increased volume of cut material flowing through the machines.

In one rotary cutter bed design, a group of inboard cutters of the bed are arranged with their axes of rotation directly in front of the opening to the conditioner rolls, inboard of conditioning structure on the rolls. One or more additional outboard cutters may be provided at each end of the bed and have their axes of rotation located outboard of the opening and the conditioning structure. In some situations, some or all of the crop streams end up against the structure behind the outboard cutters.

The cut-of quality of rotary headers can be improved in certain conditions by reducing the rotational speed of the cutterbar. In addition, the power required to drive the cutterbar can often be reduced with slower speeds. With a hydrostatically driven header, this is accomplished by reducing the flow rate of oil in the drive system. However, this method of reducing header speed also reduces the maximum power potential of the hydrostatic system due to the reduced flow rate. This causes the hydraulic system pressure to increase and in extreme conditions can result in unstable header speed and the hydrostatic system exceeding the relief valve setting.

Another potential problem with typical rotary headers is that the power for the conditioner rolls is transmitted through a belt drive system. In heavy, bulky crops, this belt drive system can become the limiting factor for machine capacity as the conditioner rolls require a greater percentage of the total header power.

Based on the foregoing, it would be desirable to have a rotary header with improved means to power the conditioner rolls.

OVERVIEW OF THE INVENTION

In example embodiments, a crop harvesting header configured for attachment to a mobile frame of a harvesting machine is provided with a cutter mechanism to cut crop material and a pair of laterally extending crop conditioner rolls to condition crop material cut by the cutter mechanism. The header includes a header power system having at least one hydraulic motor and a belt and sheave drive configured to transmit power from the at least one main hydraulic motor to the pair of conditioner rolls. The header also includes an auxiliary drive motor directly connected one of the conditioner rolls of said pair of conditioner rolls.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 2 shows a top view of an example embodiment of a harvesting header, with parts being broken away to illustrate the cutter bed, the crop conditioner rolls and the laterally extending crop conveying/helper roller with auger flights to convey crop from the cutter bed to the nip defined by the crop conditioner rolls;

FIG. 3 shows an enlarged front elevational view of an example embodiment of a harvesting header, with parts being broken away to illustrate the cutter bed, the crop conditioner rolls, the crop helper roller with auger flights, and impeller cages for facilitating crop flow from the outboard cutters to the conditioner rolls;

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
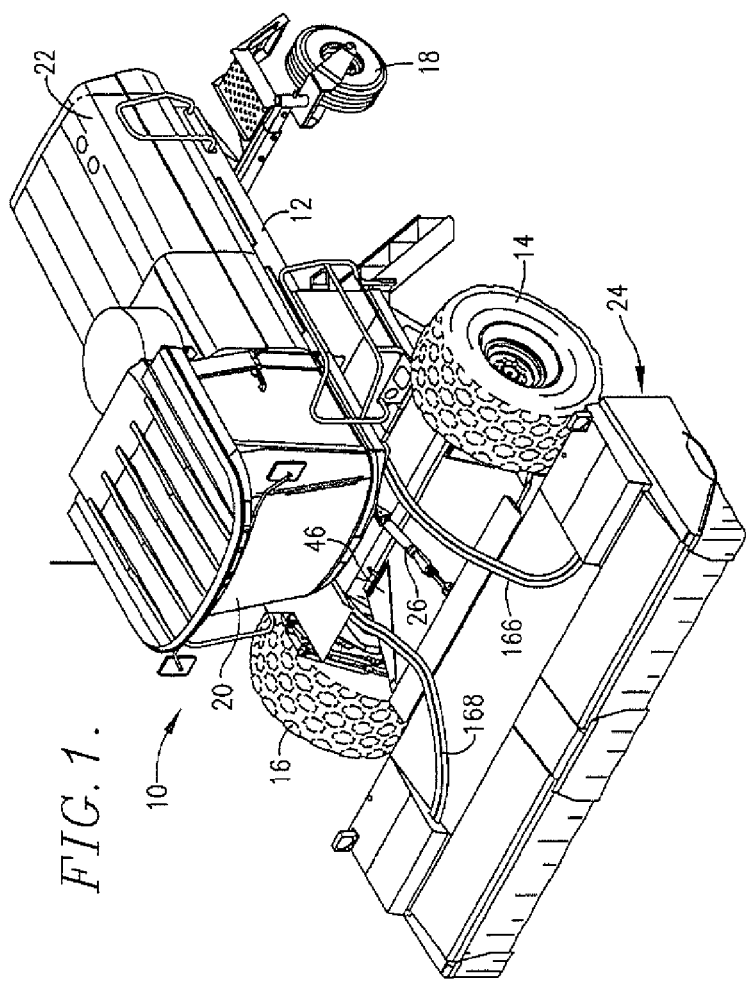
FIG. 1 shows a perspective view of an example embodiment of a self-propelled windrower that may employ a helper roller in accordance with the invention.

FIG. 1 shows a harvester in the form of a self-propelled windrower 10 operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 for movement across a field to be harvested. The frame 12 carries a cab 20, within which an operator controls operation of the windrower 10, and a rearwardly spaced compartment 22 housing a power source (not shown) such as an internal combustion engine. A harvesting header 24 is supported on the front of the frame 12 in a manner understood by those skilled in the art.

The header 24 may be similar to that disclosed in U.S. Pat. No. 6,158,201 to Pruitt et al. entitled "Rotary Mower Conditioner Having Improved Crop Flow" which is assigned to the assignee of the present invention and incorporated by reference in its entirety herein. The header 24 may be configured as a modular unit and consequently may be disconnected for removal from the frame 12. Accordingly, the frame 12 is not dedicated only to those harvesting operations provided by the header 24, but may carry other modular headers designed to perform different harvesting operations. Similarly, the header 24 may be removed from the frame 12 and installed on other variously constructed mobile frames, such as a pull-type implement. In this respect, it will be appreciated that the principles of the present invention are equally applicable to pull-type harvesting machines and machines dedicated only to mowing and conditioning crop.

Turning now to FIGS. 2 and 3, the header 24 may have a generally open, box-like framework 32 that includes a pair of tubular cross beams 34 and 36 supported at opposite ends by side plates 38 and 40. A pair of shield supports 42 and 44 are fixed relative to the side plates 38 and 40 to project rearwardly therefrom. The shield supports 42, 44 converge rearwardly and support the windrow forming shields, generally denoted by the reference numeral 46 in FIG. 1. A pair of laterally extending, upright outboard plates 48 and 50 project outwardly beyond the cross beams 34 and 36, with the inner ends of the outboard plates 48 and 50 defining therebetween the front boundary of a discharge opening 52 through which cut crop passes as it moves rearwardly in the header 24.

A laterally extending crop cutting assembly in the form of a low profile, rotary style cutter bed 66 is located adjacent the front of the header framework 32 for severing crop from the ground as the harvester 10 moves across a field. A helper roll 186 is provided for urging crop material cut by the cutter bed 66 laterally inward. The illustrated cutter bed 66 includes a series of ten rotary cutters 68 spaced across the path of travel of the harvester 10 and each being rotatable about its own upright axis (see FIG. 3). A larger or smaller number of cutters could be provided. For the sake of convenience, the cutters 68 will be denoted by the letters 68*a*-68*j*, beginning with the leftmost cutter in the series as viewed from the rear of the machine. The cutters 68*a*-68*j* are rotatably supported on an elongated, flat gear case 70 extending the full length of the cutter bed 66. The gear case 70 may contain a train of flat spur gears (not shown) that are operably engaged with one another and thus serve to distribute driving power between one another, although other forms of power distribution means may be used within the case 70 (e.g., shafts and bevel gears, belts and pulleys, or chains and sprockets).

It will be appreciated that the cutters 68*a*-68*j* are similar in construction. For the sake of brevity, only one of the cutters will be described in detail herein with the understanding that the remaining cutters are similarly constructed. Each of the cutters 68*a*-68*j* may include a generally elliptical, metal knife carrier 72, and a pair of free swinging knives 74 at opposites ends of the carrier 72, as well understood by those of ordinary skill in the art. As perhaps best shown in FIG. 2, each of the cutters 68*a*-68*j* may be ninety degrees out of phase with respect to the adjacent cutters, inasmuch as the circular paths of travel of the knives of adjacent cutters overlap one another and must be appropriately out of phase in order to avoid striking each other. Due to the positive mechanical drive connection between the cutters 68*a*-68*j* through the spur gears in the case 70, the cutters remain properly in phase with one another.

Those ordinarily skilled in the art will appreciate that the cutting action provided by the cutter bed 66 is not necessarily consistent from one plant to another, as the machine 10 moves across the field. For example, severance of the crop may occur directly in front of one of the cutters 68*a*-68*j* or within one of the front notches 80. Nonetheless, the rotating knives 74 of the cutters 68*a*-68*j* cooperatively present a substantially planar cutting zone, within which crop is severed from the ground.

In the illustrated embodiment, header 24 has a centrally disposed discharge opening 52 behind the cutter bed 66 that is shorter than cutter bed 66 and which serves as an inlet to a set of conditioner rolls 170, 172. In some embodiments of the invention, the discharge opening 52 might not be disposed centrally. The axes of rotation of cutters 68*c*-68*h* are all disposed inboard of the lateral limits of opening 52 and inboard of conditioning structure on rolls 170, 172 such that those cutters may be described as a group of "inboard" cutters. On the other hand, the axes of rotation of cutters 68*a*, 68*b* and 68*i*, 68*j* are all disposed outboard of the lateral limits of opening 52 and outboard of conditioning structure on rolls 170, 172 such that those cutters may be described as "outboard" cutters. While the illustrated embodiment has two sets of outboard cutters, other embodiments may utilize only a single set of outboard cutters, or more than two sets.

Thus, it will be noted that the cutter bed 66 projects laterally outwardly beyond both ends of the discharge opening 52 to present left and light outboard cutter sections comprising cutters 68*a*, 68*b* and 68*i*, 68*j*, respectively. The spur gears in the case 70 are intermeshed in such a manner that the cutters 68*a*, 68*b* and 68*i*, 68*j* of each outboard section rotate in the same direction, as indicated by the arrows in FIG. 2. It will also be appreciated that the spur gears are arranged in such a manner that the inner cutters 68*b*-68*i* (excluding the outermost cutters 68*a* and 68*j*) are divided into cooperating pairs, with the two cutters of each pair rotating in opposite directions. In other words, the cutters 68*b* and 68*c* rotate toward one another across the front of the cutter bed 66, as do the cutters 68*d* and 68*e*, the cutters 68*f* and 68*g*, and the cutters 68*h* and 68*i*. The illustrated cutter bed 66 is of the same general arrangement as that disclosed in the '201 patent and U.S. Pat. No. 5,463,852, entitled WIDE CUT HARVESTER HAVING ROTARY CUTTER BED, issued Nov. 7, 1995, assigned of record to the assignee of the present invention, which is hereby incorporated by reference in its entirety herein.

Each pair of oppositely rotating cutters sends a stream of severed material rearwardly between them as the machine moves through the field of standing crop. The outermost outboard cutters 68*a* and 68*j* rotate in the same direction as the inwardly adjacent outboard cutters 68*b* and 68*i*, respectively. Thus, outermost outboard cutter 68*a* rotates in a clockwise direction viewing FIG. 2, while outermost outboard cutter 68*j* rotates in a counterclockwise direction viewing that same figure. Consequently, crop material cut by outboard cutters 68*a*, 68*b* and 68*i*, 68*j* is thrown laterally inwardly across the front of the machine to the overlap region between 68*b*, 68*c* and 68*h*, 68*i*, where it is swept rearwardly.

In the illustrated embodiments of FIGS. 1-7, driving power is provided to the various driven components of the header 24 by a pair of hydraulic motors 136 and 138. As perhaps best shown in FIG. 2, the left motor 136 is supported on a gearbox 140 mounted to a front laterally extending plate (not shown) of the header framework 32, while the right motor 138 is supported on a drive housing 142 similarly fastened to the front plate. The left outer cutter 68a is drivingly connected to the motor 136 by a double U-joint assembly 144 contained in the impeller cage 82 and attached to the output shaft 146 of the gearbox 140 within a sleeve 148 fixed to the partition wall 58. It will be noted that the output shaft 146 carries a double-belt sheave 150, with a pair of belts 152 entraining the sheaves 122, 150 to drive the intermediate impeller cage 98 in the same direction as the outer cutter 6Sa and associated impeller cage 82. The right outer cutter 68j is similarly connected to the motor 138.

With the end cutters 68a and 68j being drivingly connected to the remaining cutters 68b and 68i via the spur gears in the gear case 70, driving power is supplied to the entire cutter bed 66 by the hydraulic motors 134,136. As shown in FIG. 1, the hydraulic motors 134 and 136 are connected to the hydraulic drive and control circuit (not shown) of the mower conditioner by respective conduits 166 and 168. In the usual manner, each conduit includes a supply line and a return line. Preferably, the hydraulic motors 134,136 are fluidly intercommunicated so as to share the load of driving the cutters 68a-68j, In addition, the preferred hydraulic drive and control circuit is designed to drive the cutter bed 66 in such a manner that the speed of the cutters 68a-68j remains substantially constant even if the speed of the engine (not shown) driving the hydraulic pump (also not shown) for the bed 66 lugs down such as when heavy crop conditions are encountered. Such an arrangement is disclosed in U.S. Pat. No. 5,430,997, entitled HARVESTER WITH HYDRAULICALLY DRIVEN, FLOW-COMPENSATED ROTARY CUTTER BED, issued Jul. 11, 1995, assigned of record to the assignee of the present invention, which is hereby incorporated by reference herein as is necessary for a full and complete understanding of the present invention.

As perhaps best shown in FIGS. 2 and 3, a pair of laterally extending crop conditioner rolls 170 and 172 are rotatably mounted on the supports 42 and 44 to span the discharge opening 52. In the illustrated embodiment, the conditioner rolls 170,172 comprise cylindrical metal bodies having intermeshing helical, metal ribs extending along the length of the bodies, although other conditioner roll designs (e.g., rubber-coated rolls) may be utilized. In the example embodiment, the conditioner rolls 170, 172 are arranged in a stacked relationship for rotation about respective, vertically spaced transverse axes, with the upper roll 170 being driven in a counterclockwise direction and the lower roll 172 being driven in a clockwise direction as viewed in FIG. 6. In addition, the rolls 170, 172 are yieldably biased toward one another to present a biting nip 174 therebetween that receives cut crop from the cutter bed 66 and propels the same rearwardly toward the windrow forming shields 46. The nip 174 is spaced upwardly and rearwardly from the cutter bed 66. It may also be said that the nip 174 is spaced upwardly and rearwardly from the generally planar cutting zone defined by the knives 74 of the rotary cutters 68a-68j. Whereas the example embodiment shown in FIGS. 2-6 includes a single pair of conditioner rolls 170, 172, it is also known in the art to include two pairs of conditioner rolls 170A, 172A and 170B, 172B. The front pair of conditioner rolls includes an upper conditioner roll 170A and a lower conditioner roll 172A, while the rear pair of conditioner rolls correspondingly includes an upper roll 170B and a lower roll 172B.

Figure 4:
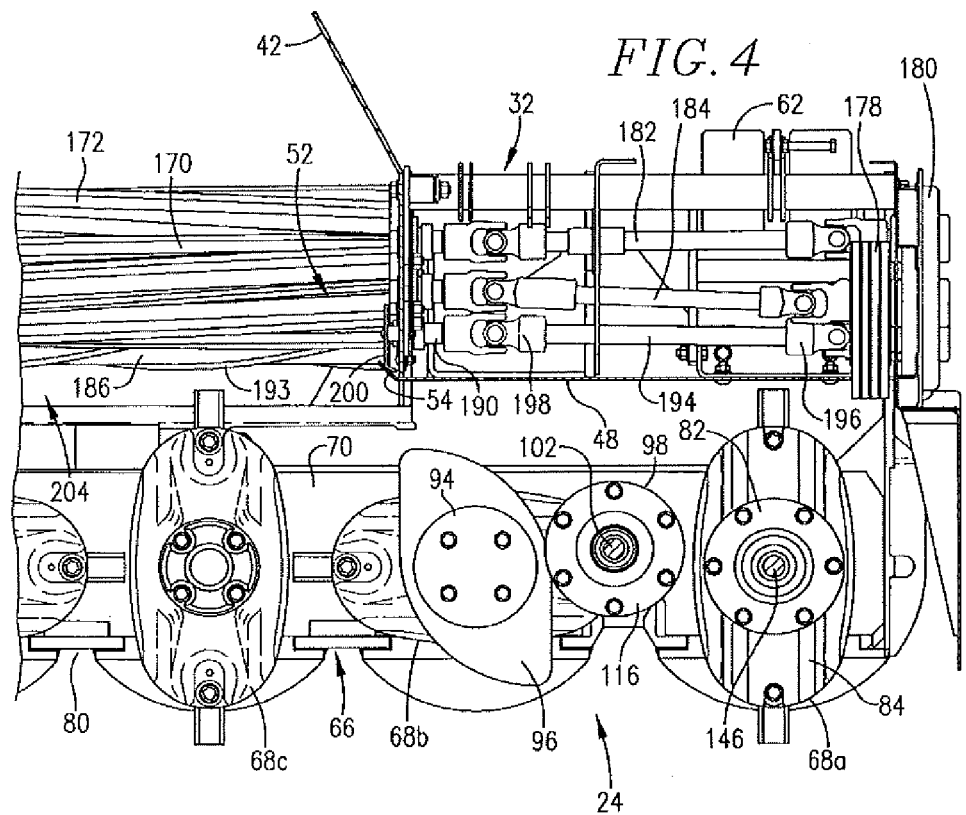
FIG. 4 shows an enlarged, fragmentary top plan view of the left side of an example embodiment of a harvesting header, particularly illustrating the three leftwardmost cutters.
Figure 5:
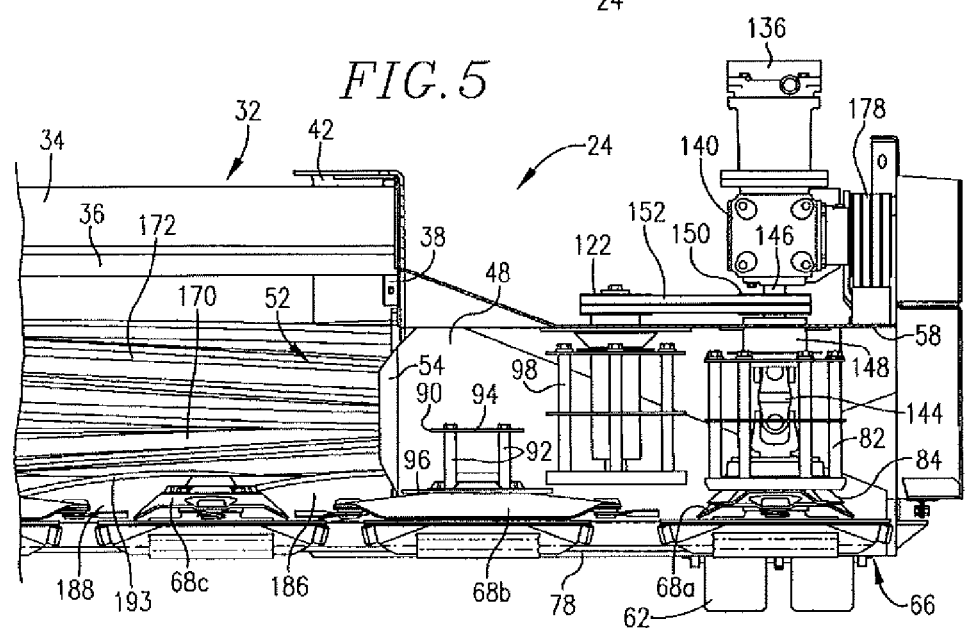
FIG. 5 shows an enlarged, fragmentary front elevational view of the left side of an example embodiment of a harvesting header, particularly illustrating the three leftwardmost cutters.
Figure 6:
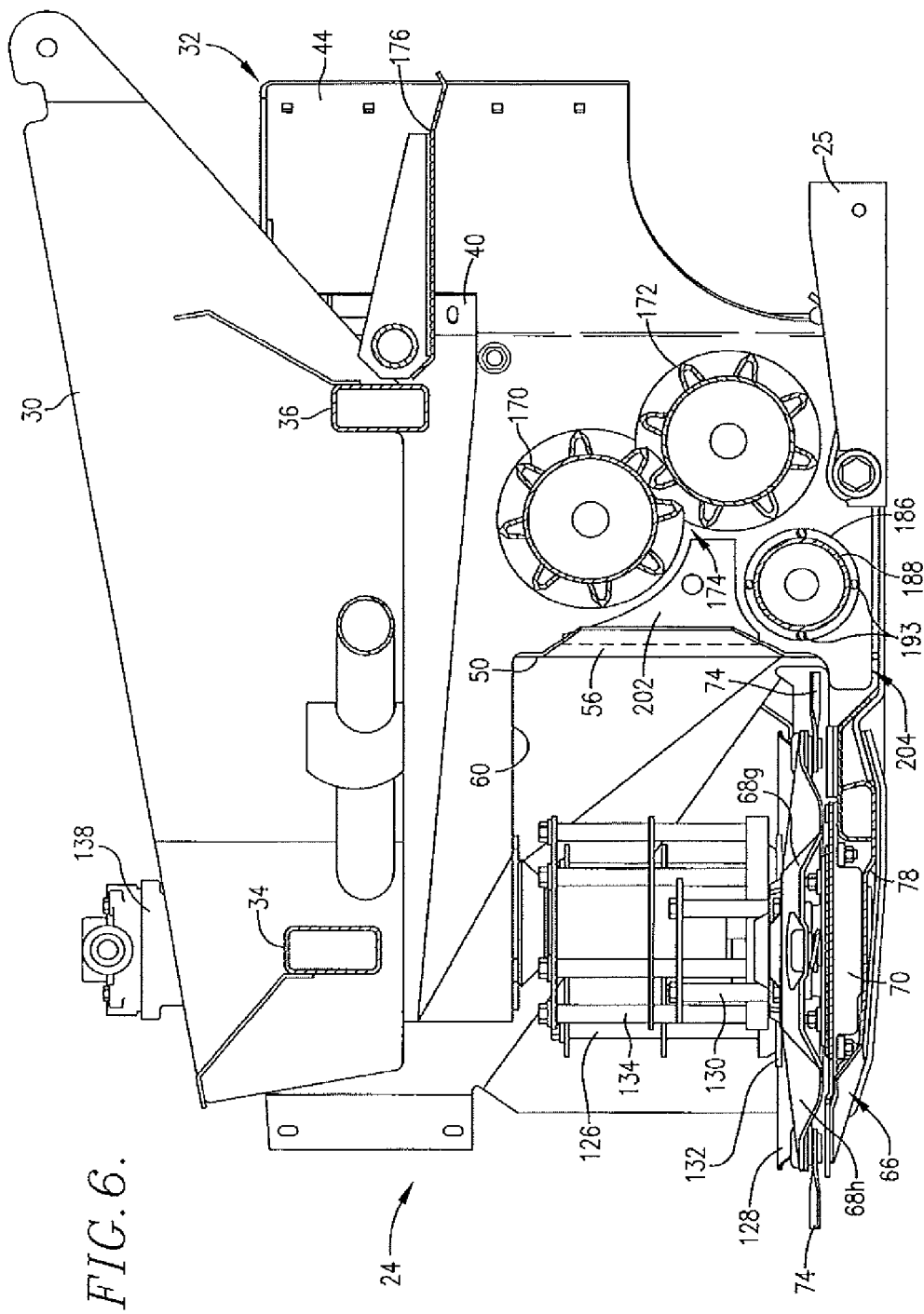
FIG. 6 is a cutaway view shows an example embodiment of a harvesting header.

As shown in FIGS. 4 and 5, a belt and sheave drive 178 is connected between the horizontal output shaft (not shown) of the gearbox 140 and a spur gear transmission (also not shown) contained within an upright case 180. In the usual manner, the conditioner rolls 170 and 172 are drivingly connected to the transmission by respective drive shafts 182 and 184, each of which has U-joint assemblies at opposite ends thereof. The illustrated drive shaft 182 of the upper conditioner roll 170 is actually connected to the driven sheave (not shown) of the belt and sheave drive 178. Accordingly, because the motors 136, 138 share the load of powering the header components, as previously noted, the conditioner rolls 170, 172 are driven by both motors 136,138. In embodiments with two pairs of conditioner rolls, belt and sheave drive 178A is connected to a first pair 170A and 172A of conditioner rolls and a second belt and sheave drive 178B is connected to the other pair of conditioner rolls 170B and 172B. The two belt and sheave drives 178A and 178B are desirably positioned on opposite sides of the header 24.

The header 24 includes a helper roller 186 that spans opening 52 in front of the lower front quadrant of lower conditioner roll 172. Helper roll 186 may be constructed and arranged similar to that set forth in the '201 Patent but extend outboard of the opening 52 and include auger flights for urging crop material that is outboard of the opening laterally inward. The helper roll 186 may be an upturning roll such that the front extremity thereof is moving upwardly and rearwardly generally toward the nip between front conditioner rolls 170, 172. The helper roll 186 may be provided with axially extending, radially outwardly projecting, circumferentially spaced lugs or ribs on its periphery that engage crop material as it moves rearwardly into opening 52. The helper roll 186 thus assists in delivering crop material associated with the outboard cutters to the nip between front conditioner rolls.

Crop material thrown rearwardly by the cutter bed 66 encounters the helper roller 186, which in turn lifts the crop material upwardly and rearwardly to the nip 174 defined between the conditioner rolls 170,172.

Figure 7:
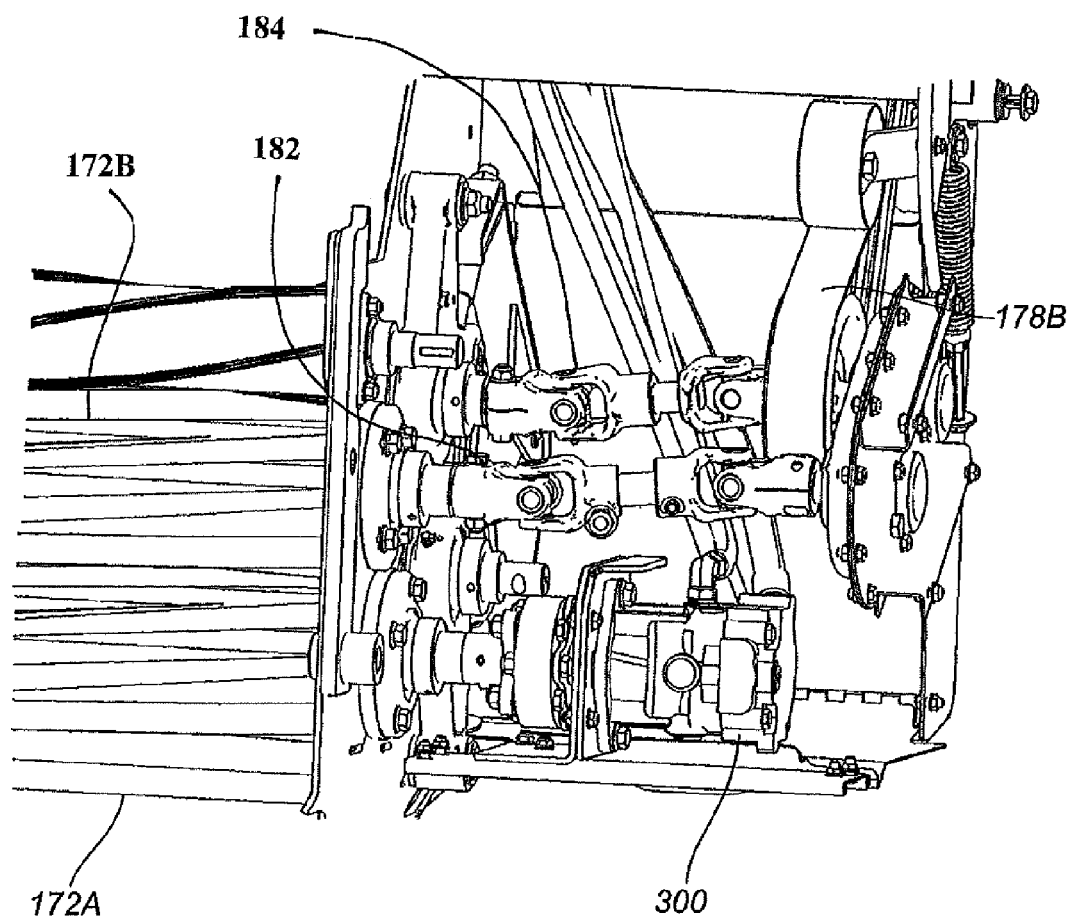
FIG. 7 shows an example embodiment of a harvesting header with an auxiliary power drive for at least one of the conditioner rolls on the header.

Turning now to FIG. 7, according to the invention, an auxiliary drive motor 300 is directly connected to conditioner roll 172A. The auxiliary drive motor 300 is connected to the drive shaft 184 of the conditioner roll 172A. In one embodiment, the auxiliary drive motor 300 may be connected to the conditioner roll 172A through a U-joint assembly. The conditioner roll 172A thus is connected to the main hydraulic motors 136 and 138 through the belt and sheave drive 178A and is also connected to the auxiliary drive motor 300. Desirably, the auxiliary drive motor is a hydraulic motor plumbed in parallel flow with the hydraulic motors 136, 138. In the illustrated embodiment, the auxiliary drive motor 300 is positioned on the side of the conditioner roll 172A opposite the belt and sheave drive 178A (not shown) connected to the conditioner roll 172A, however, one skilled in the art will understand that the auxiliary drive motor 300 may be connected on the same side as the belt and sheave drive 178A using sound engineering judgment. Additionally, the auxiliary drive motor 300 is shown attached to conditioner roll 172A, but the auxiliary drive motor 300 may also be attached to conditioner roll 170A, or in embodiments having two pairs of conditioner rolls, the auxiliary drive motor may be attached to any of the conditioner rolls 170A, 172A, 170B, 172B.

By having the auxiliary drive motor 300 connected directly to the conditioner roll 172A, all of its added power is available for use by the conditioner roll 172A without having to be transmitted through the belt and sheave drive 178A. While in theory there could be power from the auxiliary drive motor 300 transmitted "backwards" through the belt and sheave drive 178A to the rest of the cutter bed 66, the auxiliary drive motor 300 is desirably sized such that the conditioner roll 172A consumes more power than what the auxiliary drive motor 300 can provide. Therefore, the belt and sheave drive 178A is still in place not only to make up the difference in the power requirement of the conditioner roll 172A, but also to maintain the correct rotational speed of the conditioner roll 172A with respect to other components on the header 24.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A crop harvesting header configured for attachment to a mobile frame of a harvesting machine, said header comprising:
   a cutter mechanism to cut crop material;
   a pair of laterally extending crop conditioner rolls to condition crop material cut by the cutter mechanism;
   a header power system comprising at least one main hydraulic motor and a belt and sheave drive configured to transmit power from the at least one main hydraulic motor to the pair of conditioner rolls; and
   an auxiliary drive motor directly connected one of the conditioner rolls of said pair of conditioner rolls, wherein the auxiliary drive motor is positioned on a side of said conditioner roll opposite where the belt and sheave drive connects to said conditioner roll.

2. The crop harvesting header of claim 1 wherein the auxiliary drive motor is a hydraulic motor plumbed in parallel flow with the at least one main hydraulic motor.

3. The crop harvesting header of claim 1 wherein the auxiliary drive motor is sized such that said conditioner roll consumes more power than what the auxiliary drive motor can provide so that power from the auxiliary drive motor is not transmitted backwards through the belt and sheave drive.

4. The crop harvesting header of claim 1 wherein the belt and sheave drive provides power to said conditioner roll to make up the difference in power requirement of said conditioner roll not provided by the auxiliary drive motor and to control rotational speed of speed of said conditioner roll.

5. The crop harvesting header of claim 1 comprising two pairs of conditioner rolls, wherein the auxiliary drive motor connects to one conditioner roll of one of said two pairs of conditioner rolls.

* * * * *